US011575727B1

(12) United States Patent
Woodruff et al.

(10) Patent No.: US 11,575,727 B1
(45) Date of Patent: Feb. 7, 2023

(54) NETWORK FAILOVER FOR MIGRATING LIVE ENCODERS

(71) Applicant: Amazon Technologies, Inc., Reno, NV (US)

(72) Inventors: Eric Woodruff, Portland, OR (US); Gustaf Carl Hegnell, Beaverton, OR (US); Glenn LaMotte Diviney, Hillsboro, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 17/540,923

(22) Filed: Dec. 2, 2021

(51) Int. Cl.
*H04L 65/612* (2022.01)
*H04L 9/40* (2022.01)
*G06F 8/65* (2018.01)
*H04W 36/00* (2009.01)

(52) U.S. Cl.
CPC ............. *H04L 65/612* (2022.05); *G06F 8/65* (2013.01); *H04L 63/1425* (2013.01); *H04W 36/0011* (2013.01)

(58) Field of Classification Search
CPC . H04L 63/1416; H04L 63/1425; H04L 65/60; H04L 65/12
See application file for complete search history.

(56) References Cited

U.S. PATENT DOCUMENTS

| 10,893,087 | B1* | 1/2021 | Munoz | H04L 67/563 |
| 2007/0254659 | A1* | 11/2007 | Paul | H04W 72/005 |
| | | | | 455/436 |
| 2009/0268807 | A1* | 10/2009 | Krishnaswamy | H04W 72/02 |
| | | | | 375/240.01 |
| 2010/0150105 | A1* | 6/2010 | Miao | H04L 65/1095 |
| | | | | 370/331 |
| 2013/0083843 | A1* | 4/2013 | Bennett | H04N 19/187 |
| | | | | 375/E7.126 |
| 2014/0112395 | A1* | 4/2014 | Lee | H04N 21/23406 |
| | | | | 375/240.26 |
| 2018/0084017 | A1* | 3/2018 | Borges | H04L 65/1089 |

FOREIGN PATENT DOCUMENTS

| EP | 2709368 A2 * | 3/2014 | H04N 19/12 |
| WO | WO-2007002604 A2 * | 1/2007 | H04L 65/1016 |

* cited by examiner

*Primary Examiner* — Kostas J Katsikis
(74) *Attorney, Agent, or Firm* — Hogan Lovells US LLP

(57) ABSTRACT

Systems and methods perform a failover, handoff type of process for machines actively encoding and transcoding media content or other data, including live video. Based on dynamic analyses, including detection of needed updates due to security anomalies and encoder state evaluations, the encoder instance initially receiving a stream can restart following handoff to another encoder instance. System downtime is minimized through actions such as initializing the replacement encoder and passively migrating network resources to same, without any explicit coordination or messaging between the two instances.

20 Claims, 7 Drawing Sheets

NETWORK FAILOVER FOR MIGRATING LIVE ENCODERS

BACKGROUND

As technology continues to advance and diversify, there is a corresponding need to provide content in an increasing variety of different formats. For streaming video, this can entail live video transcoding, including that performed by the live video processing service AWS Elemental MediaLive offered by Amazon Web Services, Inc. ("AWS") or its affiliates. Customers or other service users there will send video input to a service of choice, and the service converts that video into different formats and bitrates, which may be further transmitted to other services, such as AWS Elemental MediaPackage, AWS MediaStore, and/or AWD Simple Storage Service ("S3") or content distribution networks ("CDNs") including AWS CloudFront or Akamai, which is offered by Akamai Technologies.

Many streaming customers operate long-running (e.g., "24/7") workflows, and encoding services aim for as little downtime as possible. However, occasionally a machine instance, backing a running encoder, must be replaced for security or operational reasons, and even missing a couple of seconds due to downtime causes a significant impact on viewing users and other customers (potentially causing video lag, repeating frames, no video signal, and the like). Thus, there is a need for a safe, efficient process to replace existing streaming machine instances. This need can include a capability to update the running software during a replacement and/or keep it immutable and failover independently by availability zone.

BRIEF DESCRIPTION OF THE DRAWINGS

Various embodiments in accordance with the present disclosure will be described with reference to the drawings, in which.

DETAILED DESCRIPTION

Figure 1:
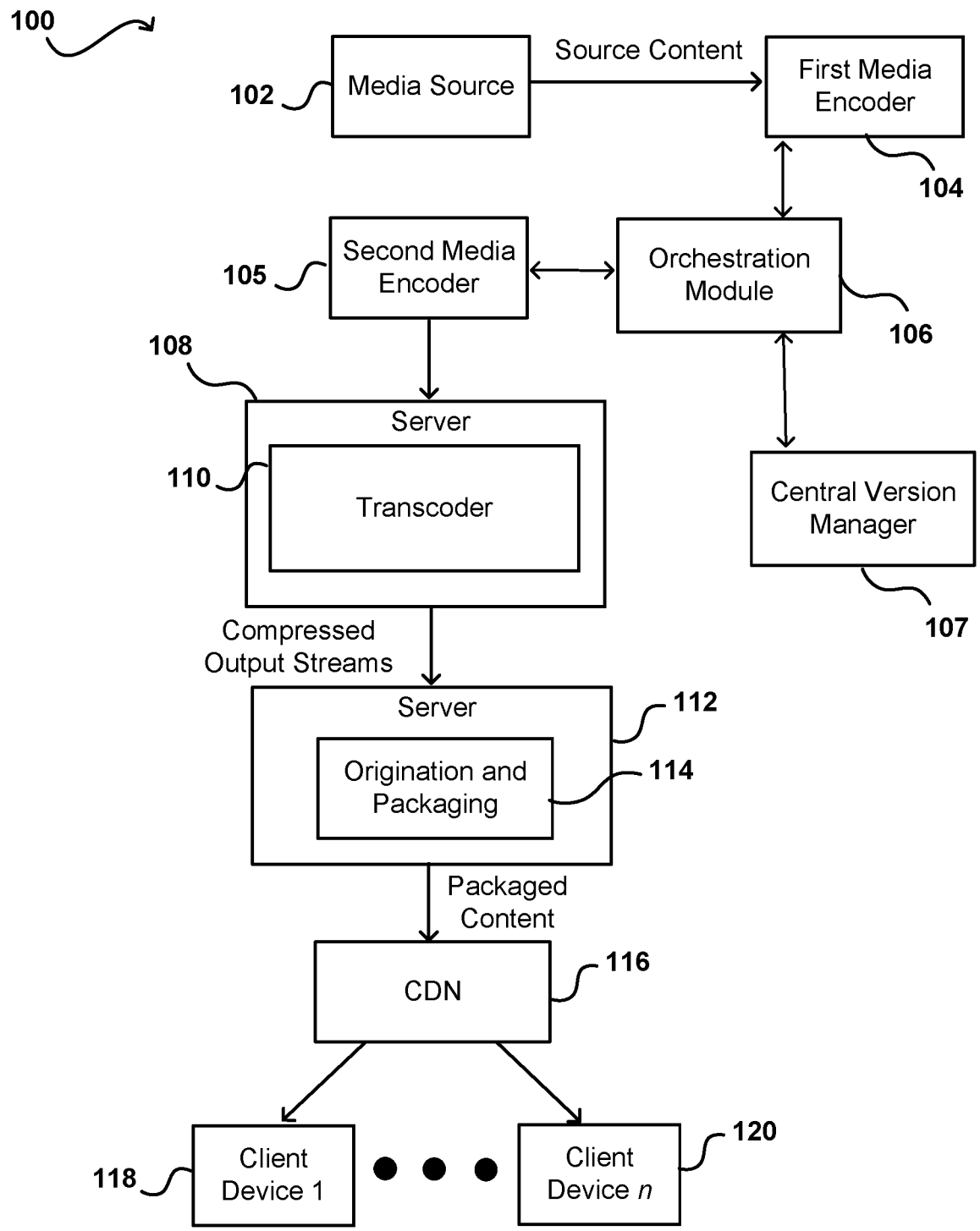
FIG. 1 illustrates an example system for the handoff of streaming media that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to a failover-type, handoff process for machines actively encoding and transcoding media content or other data, including live video, into various formats. In particular, various approaches provide for the dynamic analyses, determinations, and tasks needed in connection with patching restarts in connection with live video streams. In doing so, the present systems and methods minimize system downtime while replacing encoding machine instances by pre-warming/initializing the replacement instance and passively migrating the network resources to the new instance, without any explicit coordination or messaging between the instances themselves and without leaving either of the hosting instances in a disrupted state.

Generally speaking, video encoding is performed on a single video pipeline, where a network input, does at least a portion of decoding, processes the video, and re-encodes it at different bit rates and resolutions, depending on any applicable user configuration. Because context awareness and low latency are "mission critical," this is usually executed on a single computing device, which would need to be scaled for complex tasks, such as handling certain bit rates, resolutions (e.g., 4K and 8K), and the like. However, this is not a state-less process. As that scaled machine executes the applicable decoding and encoding algorithms, state context is important, including frame data relative to other frames, and the execution cannot simply be "handed off" to another machine on the same, or another, network; rather, a specific node is responsible for encoding, and otherwise handing, a given video workflow. Yet, given internal scanning and compliance requirements, and not to mention any encountered vulnerabilities, it is necessary to periodically disrupt online services. And the single machine/node encoding processing model can conflict with the security and other update patching requirements to keep an application and/or system instance up-to-date and deemed "safe." Further, the known method of stops and starts of a workflow, which has significant disruption problems, including potential termination of the stream and long startup.

Various embodiments of the present systems and methods allow a service provider to bring in another encoding machine instance which is networked and fully patched as well as potentially new (or at least updated) software. As will be seen, at the video encoder and system level, it is possible to oversee a planned failover mechanism by managing the steps to handle the failover and preparing the needed resources for a relatively "seamless" transition that will not interfere with service customers' encoding processes. For the avoidance of doubt, while the term "video" is frequently utilized herein, such is merely for convenience and readability, and the present systems and methods may be applied on any sort of streaming data, including audio, captioning, other metadata, and multiplexed data in single packets. Various other such functions and approaches can be used or performed as well within the scope of the various embodiments as would be apparent to one of ordinary skill in the art in light of the teachings and suggestions contained herein.

FIG. 1 depicts a high-level view of an example environment 100 in which aspects of the various embodiments can be implemented. To be clear, all encoders and other related resource instances may be in "the cloud," edge machines, or on-premise machines, or any sort of combination thereof. In this example, media content (e.g., live video and audio) is captured, generated, or otherwise obtained by a media source 102. This can include, for example, live video data captured by one or more cameras. The media source 102 can transmit at least a portion of that content to a first media encoder 104 for encoding into an output stream in a particular, determined format. As discussed herein, in various embodiments, a handoff from the first media encoder 104 to a second media encoder 105 can be performed for a variety of reasons, including security and other software update patching.

In some embodiments, the media source 102 and the multiple media encoders 104 and 105 could be in the same location or connected to the same local or wide-area network ("WAN"). The content may be sent through an appropriate channel, such as across one or more wireless or broadcast networks, to be received to an appropriate address or destination, including a network address or application programming interface ("API"), among other such options. The media encoders 104 and 105 are selected, in certain illustrative embodiments, from a number of encoders, operating on one or more servers or a pool of electronic resources, capable of processing at least the type of content at issue. The media encoders in this example can be implemented in hardware and/or software, and can be able to receive and process input. This may include, for example, Internet of Things ("IoT")-type functionality wherein the media encoders can receive these parameter values, perform processing or analysis, and execute the failover processes and techniques herein.

An orchestration module 106 can serve as a resource manager and detect instances which are currently running, the number of tasks running, and/or whether a failover deployment is in progress. System components, including the media encoders 104 and 105, as well as a central version manager 107, may then query, or be queried by, the orchestration module. In some embodiments, a service such as AWS' Elastic Container Service ("ECS") can be applied, sometimes in connection or communication with the orchestration module. ECS is a cloud computing service capable of managing containers and allowing developers to run applications in the cloud without having to configure a code-running environment. More particularly, starting an encoding task on a machine instance can be considered a new deployment of code to a machine; if there's a new task or a forced new deployment requiring a current task to end and initiate a new task, such can be ascertained by the orchestration module and hence by a user through querying, or other communication with, the orchestration module.

In some embodiments, handoff overseeing, including needed state and other determinations, is handled by a central version manager 107. The central version manager is a data store that keeps the set of configurations and has a version associated with each created update to it. In at least some embodiments, a version specification for the handoff is generated, potential by the central version manager. The central version manager and/or the orchestration module could be configured to additionally, or alternatively, receive vulnerability and other update notifications and make associated determinations for purposes of handoff specification preparation and/or other, related tasks. The specification may be viewed as a sort of a "version bill of materials," noting build versions which have been developed and tested together. Such facilitates a code deployment in a handoff pipeline with that fixed set of versions across different systems components.

As illustrated (only for the second media encoder 105 for convenience), a media encoder's one or more servers 108 may include one or more transcoders 110 which can concurrently perform transcoding of a source or primary input video stream into various output streams in different formats. The incoming video stream can be received by the server 108 to be decoded and re-encoded, or transcoded, into one or more output formats, such as may be appropriate for, or supported by, potential recipient devices, systems, processes, components, or applications. In at least one embodiment, these output formats may require or utilize different values for a set of video format parameters, as may include parameters such as resolution, frame-rate, color depth, video codec, chroma sampling, audio channels, and audio codec, among others, to build a video adaptive bitrate ("ABR") stack (also referred to as an "ABR ladder") that enables the transcoded video to be presented on, or via, a variety devices and networks.

The orchestration module 106 can reside on the server 108, or a different server or component (even the media encoders 104 and 105, in some embodiments), and it can aggregate and/or analyze the video parameter values that are actually used for the input and output streams. The orchestration module 106 control algorithm, if not contained on the server 108 can transmit such parameter values, software-related information, and other handoff-related data to the media encoders 104 and 105.

In at least one embodiment, the server configuration can include at least a first server 108 with software to perform tasks such as media format conversion or transcoding, and a supplemental server 112 with software 114 to perform tasks such as content origination and packaging. It should be understood that a resource provider such as AWS may provide multiple servers, or portions of multiple servers, that can provide instances of such functionality for processing different content streams. The content-processing applications on each of these servers 106, 112 may need, or at least be intended, to operate in real time, or at least near real time, for at least some types of content in order to deliver an intended experience to consumers of that content Output streams of the content can be delivered, in some illustrative embodiments, via a content delivery network ("CDN") 116 or other content delivery system or service, as may include CloudFront from Amazon.com, Inc. A content management and delivery service, such as AWS Elemental MediaLive, may utilize various servers 108 to perform various content-related tasks on this source content that is to be distributed.

In this example, the media content is to be processed and ultimately delivered, or at least made available, to any number of various client devices 118, 120 or other such recipients. These client devices 118, 120 may be of the same or different types, and may have similar or different capabilities, such as different display resolutions, frame rates, aspect ratios, or support for different content formats. Such devices may include, for example and without limitation, smartphones, tablet computers, desktop computers, notebook computers, televisions, set-top boxes, streaming media devices, wearable computers, virtual reality ("VR") or augmented reality ("AR") devices, projectors, video game consoles, and the like. Content delivery to the client devices 118, 120 may be for any number of purposes, including, but by no means limited to, the broadcasting of live events, such as sporting events or game tournaments.

In order to transmit the source content from the media source 102 to the client devices 118, 120, there are two encoding or compression steps which may be performed in some embodiments, although additional or alternative steps could be utilized in other example systems and embodiments. In this example, the media encoder 104 performs a contribution encoding operation on the source content that compresses live video frames into a high quality, but limited bandwidth, transport stream to transmit the video data to a server, which may be a cloud server provided by a resource provider in a resource provider environment in at least some embodiments.

Figure 2:
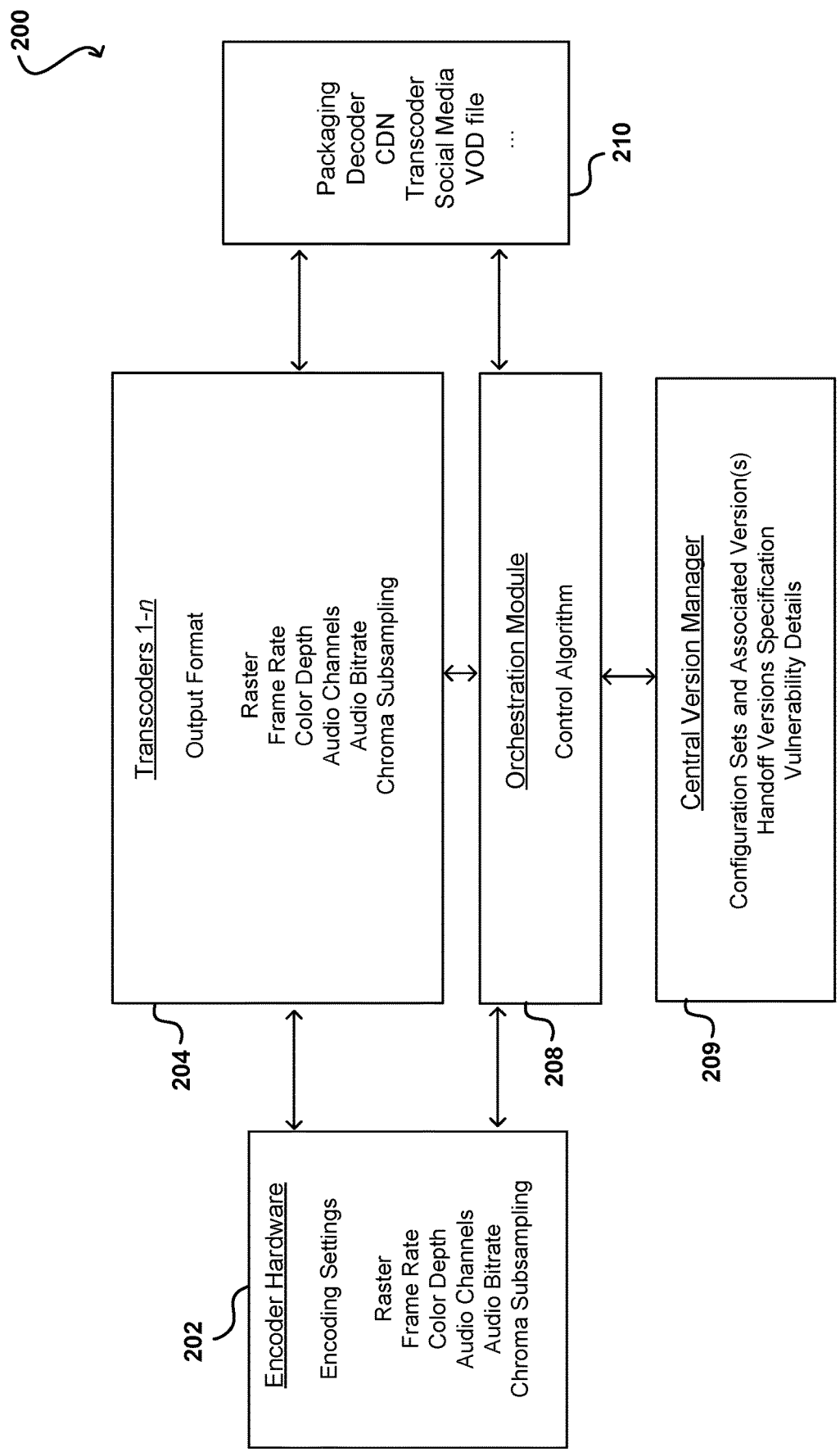
FIG. 2 illustrates certain components details for an example system for handing off an active live stream to a second encoder, in accordance with various embodiments.

FIG. 2 illustrates another example view of certain components of a system 200 that can be used to implement aspects of various embodiments. As illustrated, this system 200 includes encoder hardware 202, such as AWS Elemental Link, to perform a contribution encoding and provide a contribution feed. This encoder hardware 202 may be able to provide a video feed at various video format parameter values, such as 4K resolution, 60 fps framerate, and 10-bit color depth. The contribution feed may be provided to one or more transcoders 204, which generate output streams in various formats to be provided for further processing and distribution, as discussed elsewhere herein or known in the art. In addition to software version metadata, these values can be provided to, or obtained by, am orchestration module 208, potentially working with a central version manager 209, which here is illustrated to be logically located with the transcoders, but could logically or physically be located elsewhere, such as on the encoder hardware or provided by a third-party provider.

In at least some embodiments, the encoder hardware 202 may also determine or obtain current conditions, such as network conditions, and automatically modify the parameter values based upon those conditions, such as a currently-available bandwidth. Thus, the encoder hardware may take the common parameter values provided by a control algorithm, potentially executed by the orchestration module 208 and utilize those at least to an extent allowed by current network conditions, particularly helpful for live streams. In various embodiments, a control algorithm can use aggregation and comparison logic to determine a set of parameter values to use for current conditions. This may include, for example, detecting or receiving information about a change in network or resource state that may impact available resources, such as an available amount of bandwidth or processing capacity over a current or future period of time. The control algorithm in at least some embodiments can attempt to adjust parameter values in order to get the highest possible quality given current conditions, state, availability, or other such factors as discussed and suggested herein. In other embodiments, machine learning may be used to attempt to infer an optimal set of parameters based on current network conditions, which may involve reducing one or more settings to conserve bandwidth but then increasing one or more other settings to advantageously utilize at least a portion of that bandwidth to provide higher quality output. In some embodiments, machine learning may also be used to predict optimal settings based upon changing network conditions, or anticipated recipient changes, among other such options, such that the changes are more proactive than reactive, which can provide at least some advantage in video quality and may reduce a presence of dropped frames or other such issues. For purposes such as output, the system 200 can include (as shown by representative component(s) block 210) packaging, decoder, CDN, social media formatting, and Video-on-Demand ("VOD") file-related features.

Figure 3:
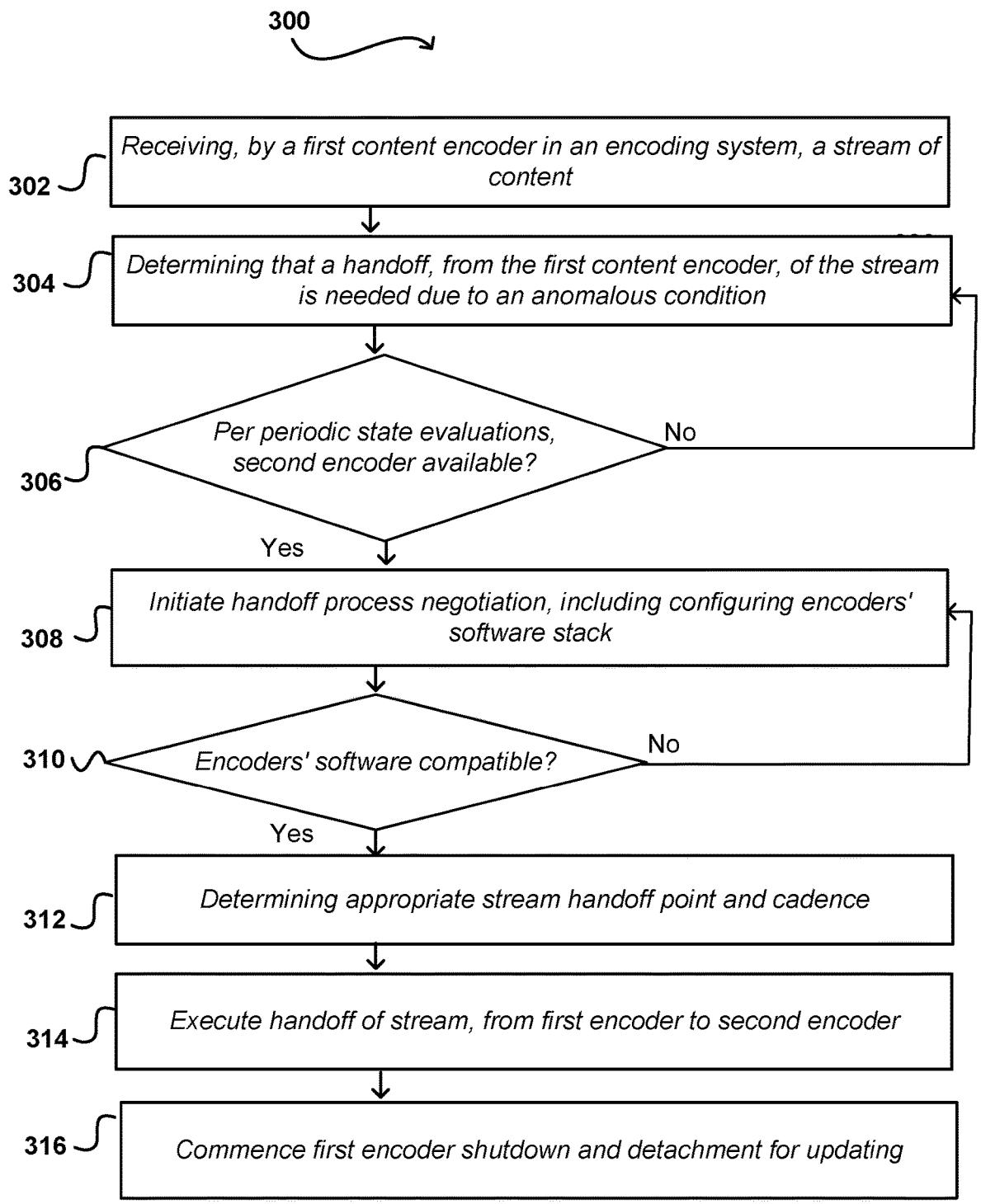
FIG. 3 illustrates representative steps of an example handoff process for machines actively encoding and transcoding media content, in accordance with various embodiments.

FIG. 3 illustrates an example process 300 for a failover handoff process for machine instances actively encoding and transcoding media content. The various process actions can be made dynamically and automatically in at least some embodiments. As noted, the handoff need may arise for various reasons, including software updating. This handoff can be overseen by a control module or a network-based scheme, where the involved machines execute the handoff by themselves, with the latter case including a designation of the new machine as leading the handoff operation; in some embodiments, an orchestration module and/or central version manager, or other such component or process, can be applied in connection with the various process 300 determinations and analyses. And it should be understood that for this, and other processes mentioned herein, that there can be additional, fewer, or alternative steps performed in similar or alternative orders, or at least partially in parallel, within the scope of the various embodiments unless otherwise specifically stated. Further, while this process 300 is described with respect to the specific example of video processing, it should be understood that various other types of data which can be compressed, encoded, and/or transmitted can benefit from use of such a process in accordance with various embodiments.

The process 300 commences at step 302, where an incoming content stream is received by a first media or other content encoding machine instance. This received stream can be encoded using a primary set of format parameters, such as may be determined based at least in part upon current network conditions and capabilities of networked encoders.

At step 304, it may be determined that a handoff, from the first content encoder, of the stream is needed due to an anomalous condition. The anomalous condition somewhere in the system can be any of a number of unusual or unexpected, or undesired situations. A security vulnerability, for example, could allow hijacking of the content stream and/or be a virus capable of spreading across all encoder process buckets as well as applicable data stores or databases; such would obviously need to be contained as soon as possible. In another vein, the anomalous condition could be needed downtime for periodic updating and patching software; there, to rectify the anomaly, preparations could be made in the form of original code packages or patches/updates to existing code packages.

As a handoff preliminary matter, embodiments can ensure, such as by step 306, that a new encoding machine instance is available, including by one or more periodic state evaluations. If new resources are available, a preparation phase may be entered in some embodiments; if a second encoder is determined to not be available, the handoff workflow could be deferred. A standard channel, having at least two pipelines or availability zones, is where the failover is orchestrated across the two availability zones. Thus, two hosts are identified and prepared, any needed software is pulled, and a validation step ensures that both zones are available and ready.

There can be at least two running encoding instances, as hardware-based and/or virtual machines, for a potential handoff. For redundancy-enabled encoding instances, there could be an instance running in each of the at least two availability zones. In essence, because of the desire to keep a live stream running, there are two availability zones for updating: a software update of a new task, using the version specification, to two availability zones at the same exact time. The use of continued running and two availability zones, with both zones on the same version specification and thus version compatibility between them, allows for the synching of information about sort of the identical video streams the two respective encoders are receiving. Both encoding machine instances may detect that they are, once the handoff process commences, running as peers, rather than in isolation. If needed resources are not available, the failover process is aborted, and any initiated system and/or software changes are rolled back.

At step 308, a handoff startup process may be negotiated, which, in some embodiments, involves one or more of grabbing needed network resources, configuring the applicable software stack, initiating the applications, and starting the receiving and processing of video data. As the encoding system in various illustrative embodiments can be a live, running system, the machines and handoff software versions will stay within the compatible versions for the networked resources in the applicable availability zone.

More particularly, to prepare a new machine instance, the network resources may be deemed "belonging" to a given encoding job and associated with a new host as part of the handoff. Given that only one Internet Protocol ("IP") address can be applied to one host, and the handoff can involve two hosts, the present systems and methods, in the interest of video stream continuity, can be configured to ensure that service is not moved to the new host until certain video processing requirements are met. Such video processing requirements may include context and cadence analyses of video state, frame segment number and cadence rate, and the like, as well as a time estimation of how long a failover or handoff may take. It is also possible to add secondary IP addresses or another alternate communication path, involving automated negotiation with the user endpoint sending content such that it gets a new IP address, to reduce network packet dropping.

During the update process, there is a requirement that no version mismatch exists for the instances to be able to sync state across zones. Some embodiments can be configured to ensure there is no sort of continuous mixing of versions between the specifications. Thus, in some embodiments, the encoders' software stack is analyzed at step 310, and updated as necessary. Compatibility requirements, including considerations of applicable service customer software and configurations, may limit, or at least impact, a switch to updated or different software running on a new machine instance.

By way of illustration of a specific illustrative embodiment, two encoder instances, in one availability zone, may be running on software version "A." Should a stream handoff need arise, such as due to an anomalous situation, the systems and methods in some embodiments can generate a new software version specification, which, for present purposes, will be referred to as version definition "B." New encoder instances, such as second and later ones, can start their operation running definition "B." If, say, the "B" instances detect that the "A" encoder instances are currently running and there a stream encoding deployment in progress, the "B" instances may be configured to not pivot network or system resources from the "A" instance for the time being, so as to not disrupt a live stream. The systems and methods can wait for two "B" instances to be operational and running before executing a handoff and removing the "A" instance from encoding availability.

Such compatibility and other analyses can assist in determining, at step 312, a suitable prepared handoff cut-off point and cadence, where it will be possible to resume processing at the next segment, which will be handled by the new machine instance, without video player disruption. When the handoff is executed, in some embodiments, a termination marker is not necessarily needed in the encoding stream.

As noted, an orchestration module can monitor whether the new encoding machine instance meets the specification criteria, as well as any other applicable requirements. In some embodiments, a timeout process can be established, whereby a handoff process initiation aborts if a predetermined amount of time has passed without the current and new encoding instances being established. The failover will then attempt, at step 314, to handoff the live encoding process to a second encoding machine running the software in the version specification or advance to the next sort of quantized set of versions that have been validated and tested to operate together.

The second encoding instance, having the resources, can configure applications needed to resume the video encoding job and prepare the resources based on the state data for the handed-off video stream. Once the new, second encoding instance is available and running, essentially in a waiting state, it will be possible to perform the transfer of encoding operations from the first encoder to the second encoder. Initialization of applications on the second instance take place, along with content stream pickup at a designated marker or buffer point.

As it is not desirable to disrupt a live content stream, these, and other, handoff operations can occur in the background, without degrading or otherwise negatively impacting the live stream initially on the first encoder. In some embodiments, to help ensure stream stability, caches and stability threshold times may be set, with a handoff process terminated if a stability threshold time is not met; in the event of such process termination, a new, third cloud instance may be identified as available and selected, if it meets criteria such as the version specification and the stability threshold. As the first instance completes the end of its shutdown process, a notification or other communication can be transmitted to the orchestration module that this task has completed. The orchestration module can then update its records of instance states accordingly.

One of the two running peers can then receive, at step 316, a shutdown preparation signal or command, with such instructing that the other peer is executing will need handoff of certain video data such as state. Potentially, representative methods may also perform other resource cleanup steps, including those shown in FIGS. 4A and 4B. Following completion of the transfer of job-associated network resources to a new or second host, the first, or original, encoding machine may then be left in a "clean slate" state, ready for updating. For a machine flagged as having a vulnerability or other anomaly such as outdated software in need of updating, some embodiments then move on to effectively remove that machine from the active encoding process, draining that machine from the available resource pool and terminating the instance. A further step, then, in some embodiments, in parallel to commencing encoding work on the second encoder machine instance, is transmitting a shutdown signal to the first encoder machine instance.

If a new task deployment is in progress, and a currently-running task makes it possible to identify that a clean slate need not be started, the system essentially could initiate what is then a second task or replacement task by querying the orchestration module and/or other component(s) managing process tasks. Such querying could be performed in runtime by the new instance, potentially during its startup process; alternatively, the orchestrator can push needed information during handoff task startup.

As noted herein, in some embodiments, in parallel with commencing operations on a second encoding instance, to which a content stream has been handed off, a stop or shutdown signal or command may be sent to the first encoding instance. Continuing the "A" and "B" software version example above, to begin preparations for removal of the "A" instances from the available instance pool, the "A" instances can be configured to stop, following a stop or shutdown signal, at nearly the same time, to avoid mixed versions "A" and "B" being active at the same time. Any "A"-based instances can be configured to stop encoding and related operations when a "B" version goes live, so as to avoid mixed software versions being active at the same time. In the case where a stream includes video content, shutdown efforts can include generation of a record of current segment markers, although it will not be necessary to set an end tag for the video, since the stream is failing over to the "B" instances. Once the "A" instance(s) cease work on the stream, "B" instances may query or detect, potentially on an in-use state determination, the availability of the "A" network resources and migrate them to the "B" instances. The "B" instances at that point complete the streaming startup process at that point in some embodiments.

As part of the termination of the first encoder efforts, following handoff to the second machine, termination or end markers could be employed in connection with the content stream. These markers can indicate factors such as current segment number markers, buffer points, and stream cadence (or a prediction of same), as well as other details to assist the second encoding machine as it goes live. The transmitted factors can be housed, temporarily or longer, in a data store, accessible by the two instances and/or the orchestration module. Following successful handoff, a shutdown command may go to the first instance. Of course, the system will not want to send any termination notice upstream to the streaming user or viewing client devices.

In some embodiments, Linux system process signals are employed during the handoff. For example, on the first instance, during the shutdown, typically during a stop and a signal received; this starts a timer where that instance has a fixed amount of time (such as sixty seconds) to complete the flushing of any buffers and write, to one or more data stores, any end tags (similar to what would be done in the event of a user stop request). The system, such as via orchestration module queries, can then detect, similar to how the second encoder did on its startup, that there is to be a first instance shutdown, albeit for a handoff (not a system-wide shutdown). The system can, in some embodiments, perform a clean detach of the resources used as part of the first instance. It may be possible for the system to migrate at least some of those resources to the second instance for continued content stream processing.

Some illustrative embodiments may employ an alternative, immutable failover-only process, entailing no software updating as part of the stream encoding handoff. In such a case, encoders are running on version "A" on two instances, each in one availability zone. For this alternative process, for each encoder instance, the following actions can be taken, beginning with a new "B" software instance starting operation, in the same availability zone as an instance running definition "A." The "B" instance detects an "A" instance is currently running and there a deployment is in-progress; the "B" instance does not pivot network resources from the "A" instance during this time, in order to not disrupt operation of the "A" instance. Once the new "B" instance is running, a stop or shutdown signal is sent to the "A" instance, so it can commence shutdown and be removed from the available instance pool.

For video content, the "A" instance shutdown, in some embodiments, includes recording current stream segment markers, without setting an end tag to mark the end of the stream, and synching with the encoder in the other availability zone. When the "A" instance stops operation, the "B" instance polls or otherwise detects, based on an in-use state evaluation, the availability of the "A" instance network resources and migrates them to the "B" instance. The "B" instance may then complete its startup process.

Representative embodiments could start and orchestrate the second encoding machine instance essentially "taking" resources from first instance. Moreover, packet encapsulation and load balancing techniques, including those known in the art, can be applied to monitor where encoding data packets are going; through one or more components and/or sub-components in some embodiments, could be performed at the encoder level, and could use video-specific steps.

Following processes and schema herein provides the considerable time and resource benefit of not requiring any sort of rollback. Advantageously, these processes and schema minimize the time needed for handoff down to a small number of seconds or no dropping at all of received content stream, especially when compared to the known forceful instance termination and clean startup (which requires a magnitude of several critical minutes).

In an example step function process for content stream encoding migration, the process begins with a determination whether an update of handoff task definitions and the like is needed. If so, multiplexing (or "muxing") parameters are received, and a multiplexing program is executed, including a pipeline providing updated task definitions for storage, with the multiplexing reuniting separated audio and video. Based on success of these pipeline efforts, in some embodiments, the subject encoder instance may be terminated as discussed herein, and the workflow flagged as a success. Should there be a failure of the pipeline efforts, the update process can be stopped, and any in-progress updates (e.g., definitions) undone, and the entire workflow rolled back. If handoff task definitions are not in need of updating, prior task definitions may be applied when, for example, performing the failover handoff and draining an encoder instance.

Figure 4A:
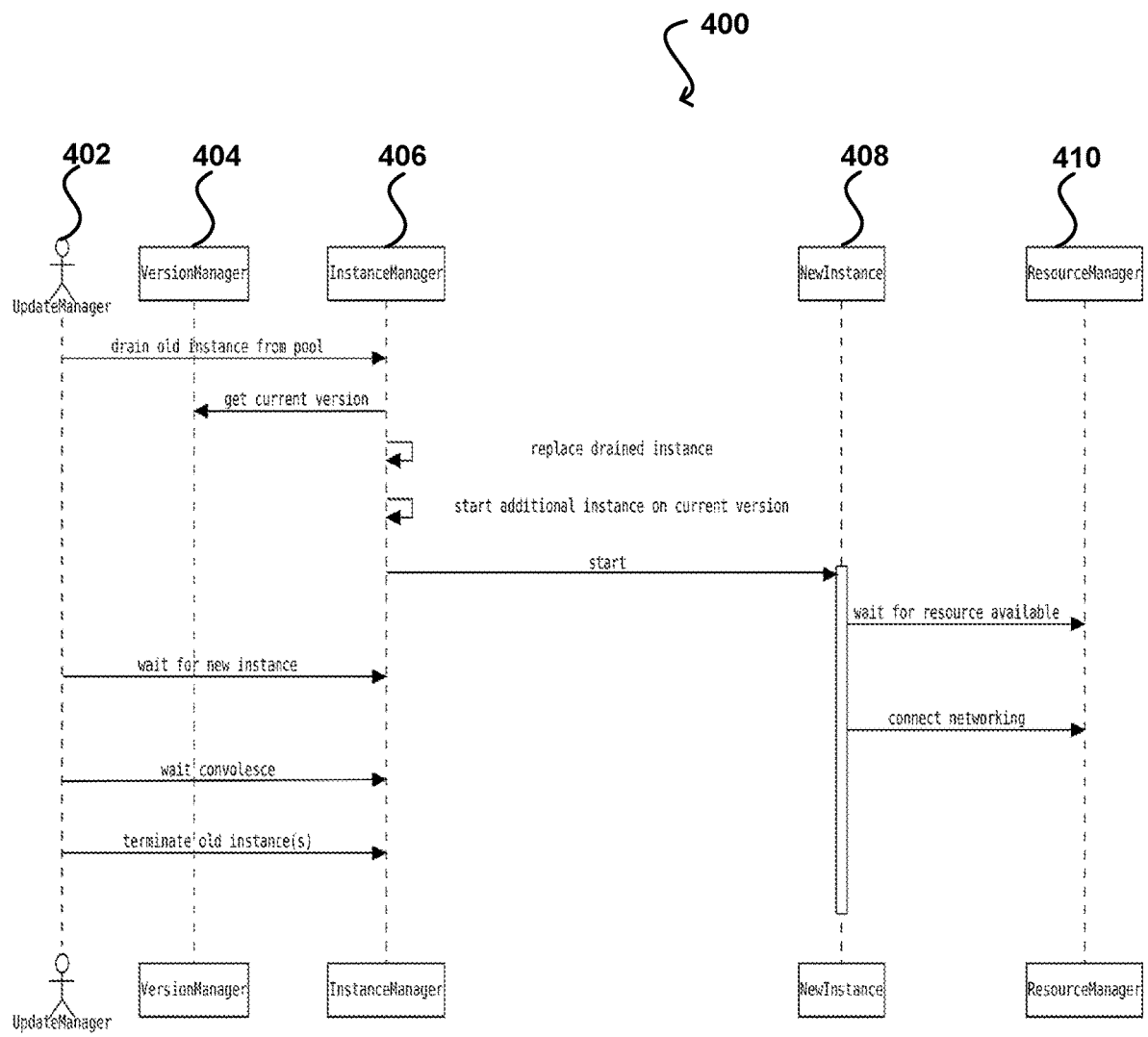
FIGS. 4A and 4B illustrate representative details for example handoff processes for machines actively encoding and transcoding media content, in accordance with various embodiments.
Figure 4B:
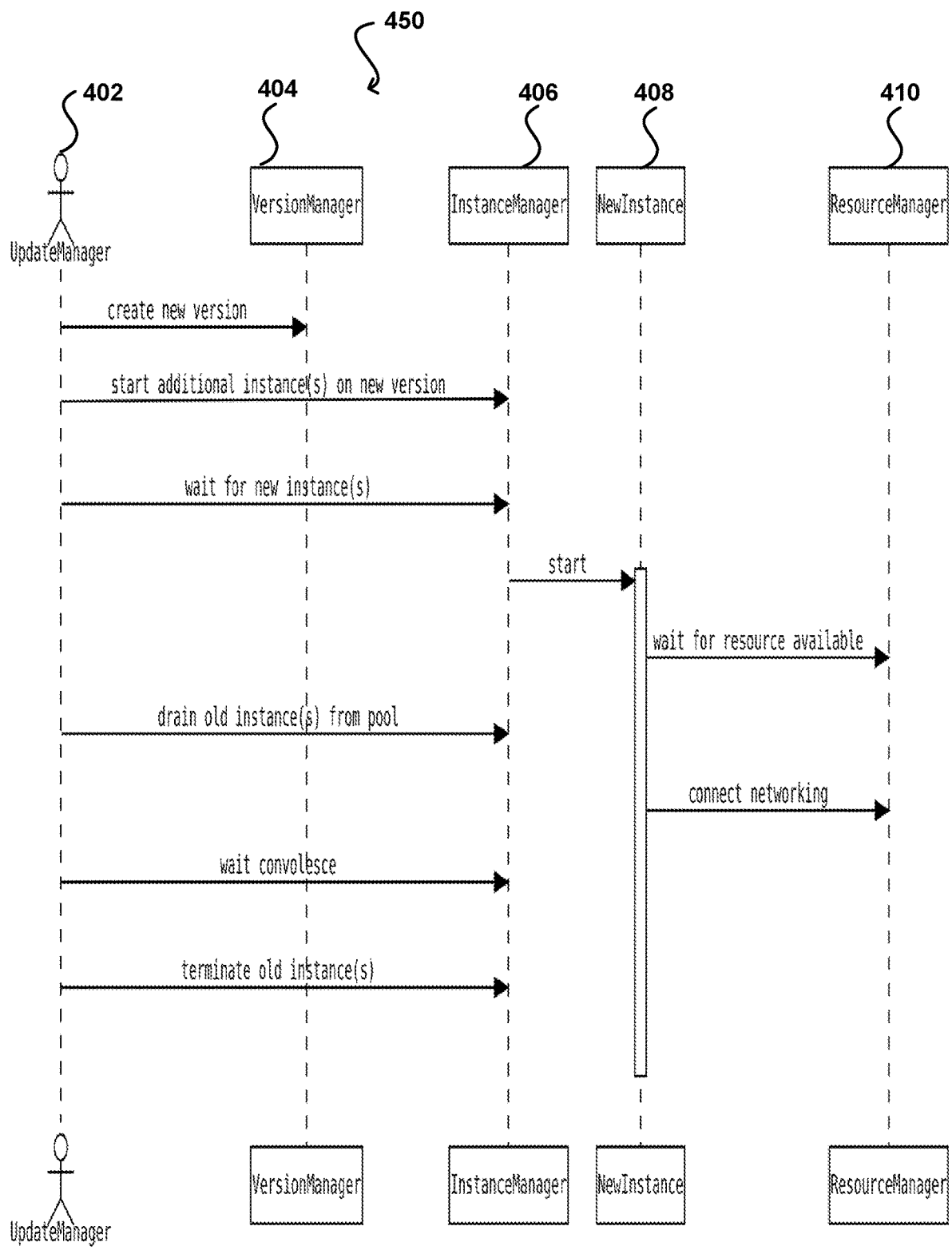

FIGS. 4A and 4B further illustrate certain details of, and timing for, example handoff processes for machines actively encoding and transcoding media content, in accordance with various embodiments. Both figures assume a reason for an encoder handoff, such as an anomalous condition, exists. In the sample sequence 400 of FIG. 4A, an overall update manager 402 component or module works, in tandem with a software version manager 404 and an encoder instance manager 406, to perform tasks which can include waiting for a new encoder instance 408 to become available, updating the new instance, and removing the prior instance from the pool in order to update that instance. In addition to the update manager 402 in this embodiment, a separate resource manager 410 may assist with resource availability determinations and network connectivity. In the scheme 450 illustrated in FIG. 4B, similar elements are implicated, although the order of their tasks differs at least in that a new update configuration or build version is created and started on the new encoder instance 408 at an earlier stage than the scheme of FIG. 4A.

Figure 5:
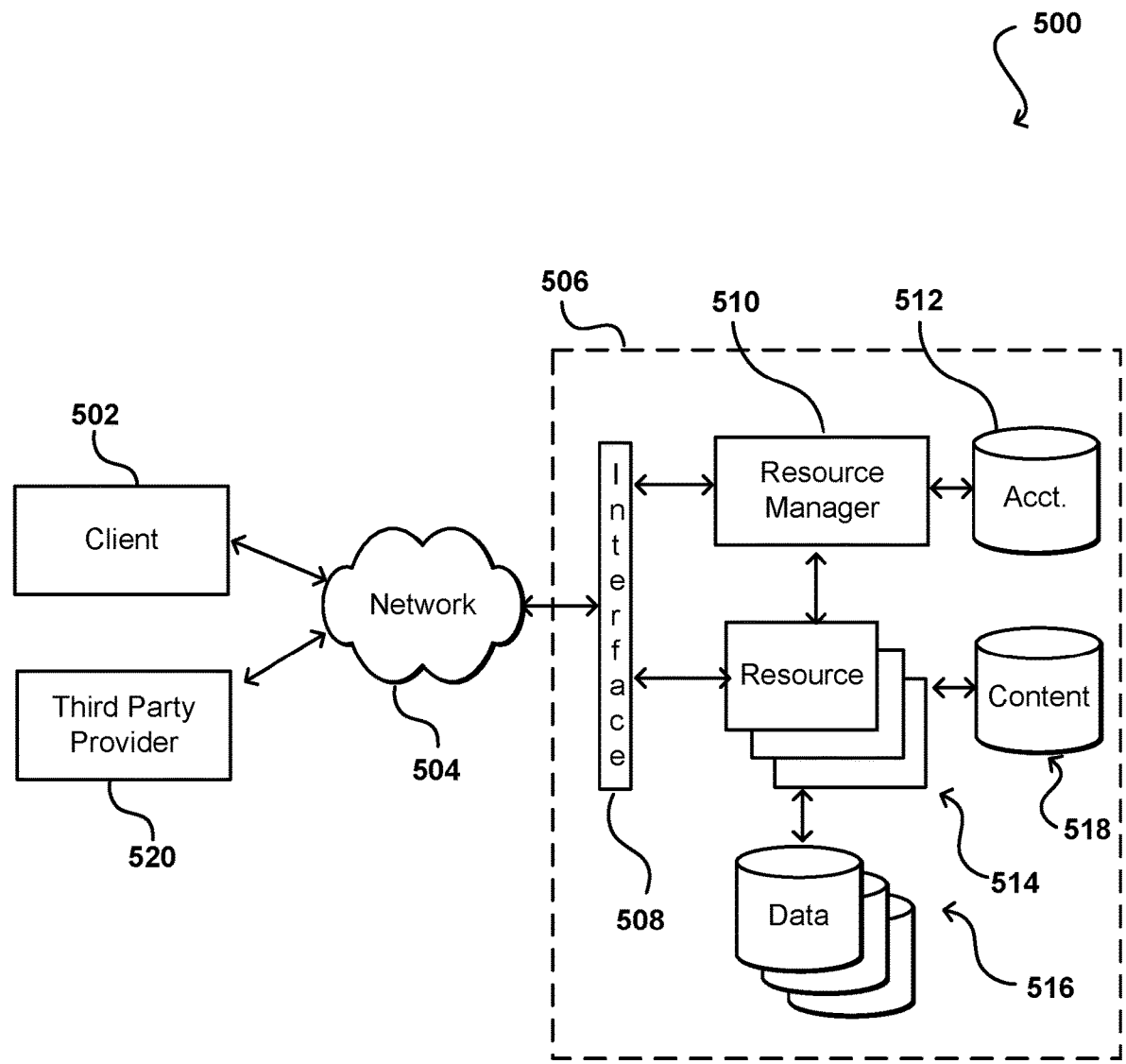
FIG. 5 illustrates an example resource environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a WAN, a local area network ("LAN"), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user can submit a request that is received to an interface layer 508 of the provider environment 506. The interface layer can include application programming interfaces ("APIs") or other exposed interfaces enabling a user to submit requests to the provider environment. The interface layer 508 in this example can also include other components as well, such as at least one Web server, routing components, load balancers, and the like. When a request relating to a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user or otherwise as warranted by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls.

In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

In this example, the provider environment includes a plurality of resources 514 of one or more types. These types can include, for example, application servers operable to process instructions provided by a user or database servers operable to process data stored in one or more data stores 516 in response to a user request, with one or more data stores holding encoding media content 518. In at least some embodiments, the processing of the request may cause results to be generated using data or content 518 from a third party provider 520, results to be provided to that provider, or at least a portion of the functionality for the request performed by the third party provider.

Figure 6:
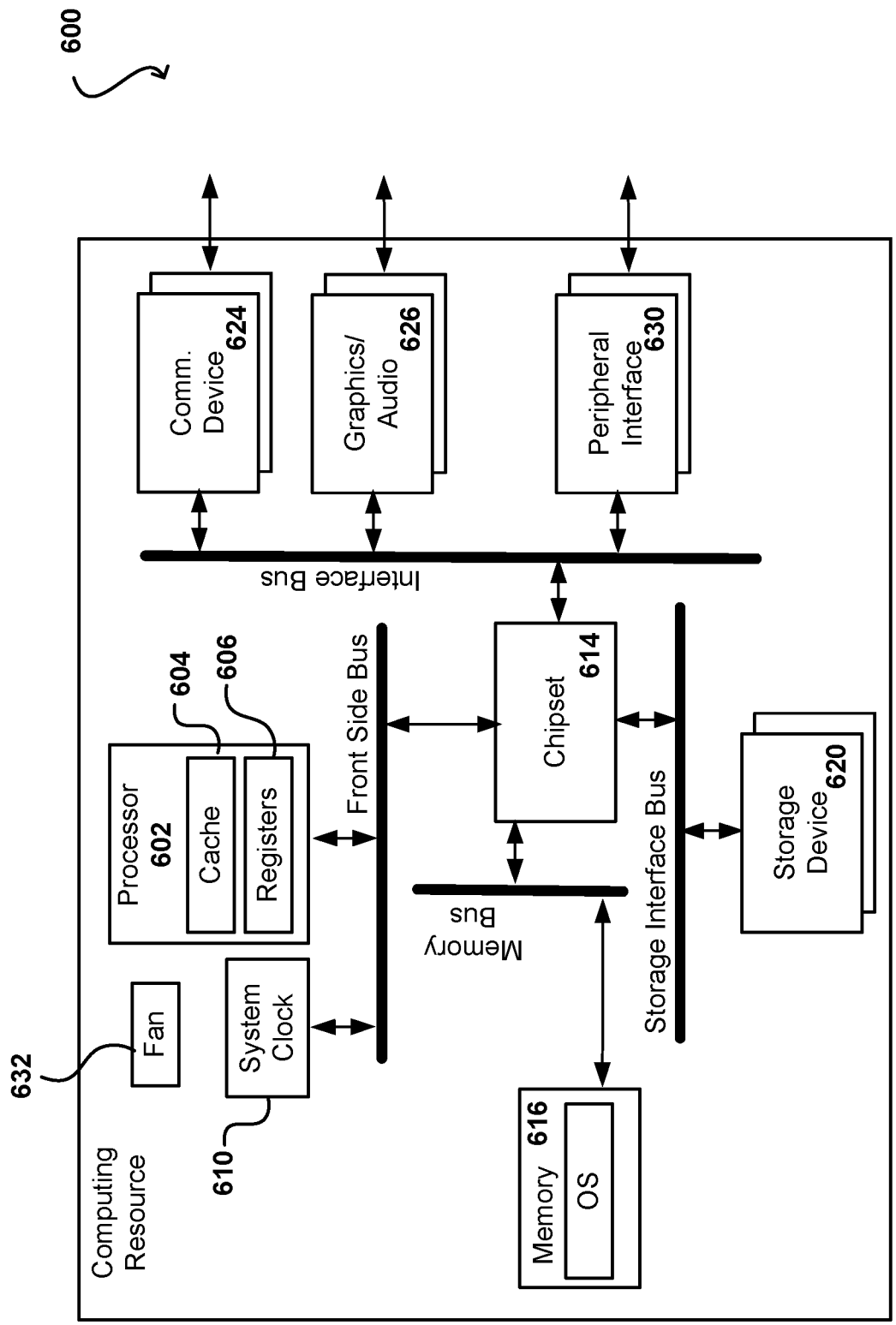
FIG. 6 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 6 illustrates components of an example computing resource 600 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 600 (e.g., a desktop or network server) will have one or more processors 602, such as central processing units ("CPUs"), graphics processing units ("GPUs"), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 630 for connecting peripheral devices, such as printers, keyboards, and the like. At least one cooling fan 632 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory ("DRAM") module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus ("USB") device, data storage (e.g., flash or disk storage), a network card, a peripheral component interconnect express ("PCIe") card or interface 630, a communication device 624, a graphics or audio card 626, and a direct memory access ("DMA") card, among other such options. In some embodiments, components such as the processor, controllers, and caches can be configured on a single card, board, or chip (i.e., a system-on-chip implementation), while in other embodiments at least some of the components may be located in different locations, etc.

An operating system ("OS") running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect ("PCI") or small computer system interface ("SCSI") communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit ("GPGPU")). In such cases, the CPU may interface with one or more I/O devices. In some cases, these I/O devices may be special-purpose hardware designed to perform a specific role. For example, an Ethernet network interface controller ("NIC") may be implemented as an application specific integrated circuit ("ASIC") comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device, while the I/O adapter device is internally integrated into the host device in some embodiments. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment ("PXE") boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, by a first encoder of a plurality of networked content encoders in a content streaming system, a live stream of video and audio content;
   determining, based at least in part on an anomalous condition in the content streaming system, a need for a handoff of the live stream from the first encoder;
   performing a state evaluation, of one or more components of the content streaming system, to determine that a second encoder is available;
   negotiating, based at least in part on a software version specification of software executing on the first encoder and the second encoder a process for the handoff of the live stream;
   determining a handoff point for the live stream;
   executing, based at least in part on the software version specification and the handoff point, the process for the handoff;
   delivering, based on output from the second encoder, a packaged stream via a content delivery network ("CDN"); and
   removing the first encoder from the plurality of networked content encoders.

2. The computer-implemented method of claim 1, wherein the anomalous condition in the content streaming system is a security vulnerability.

3. The computer-implemented method of claim 1, further comprising:
   configuring one or more of the central version manager or the orchestration module to receive a notification of the anomalous condition.

4. The computer-implemented method of claim 1, wherein each of the plurality of networked content encoders operates in one of at least two availability zones.

5. The computer-implemented method of claim 4, wherein the process for the handoff is executed during encoding of the live stream and wherein the software version specification includes update information for software versions executing on one or more of the plurality of networked encoders, the update information synchronizing the software versions across the at least two availability zones.

6. A computer-implemented method, comprising:
   receiving, by a first encoder of a content streaming system, a stream of content;
   receiving notification of an anomalous condition in the content streaming system;
   determining, by an orchestration module, that a second encoder, in the content streaming system, is available for a handoff of the stream of content;
   generating, based at least in part on a synchronization of software versions executing on the first encoder and the second encoder, a handoff specification;
   determining a handoff point for the stream of content; and
   transferring, based at least in part on the handoff specification and the handoff point, processing of the stream of content.

7. The computer-implemented method of claim 6, further comprising:
   delivering, based on output from the second encoder, a packaged stream via a content delivery network ("CDN").

8. The computer-implemented method of claim 6, further comprising:
   removing the first encoder from a pool of available encoders in the content streaming system.

9. The computer-implemented method of claim 6, wherein the content streaming system executes across one or more cloud-based networks.

10. The computer-implemented method of claim 6, wherein the determination that a second encoder is available is based at least in part on a state evaluation of one or more components of the content streaming system.

11. The computer-implemented method of claim 6, wherein the stream of content is a live stream including video data and audio data.

12. The computer-implemented method of claim 6, further comprising:

detecting, by the orchestration module, a change in content streaming system resources; and determining, by the orchestration module, whether the second encoder satisfies predetermined compatibility criteria.

13. The computer-implemented method of claim 6, wherein the handoff specification includes encoder software version compatibility data.

14. A content streaming system, comprising:
   a first content encoder;
   a second content encoder;
   an orchestration module;
   a central version manager;
   at least one processor; and
   memory including instructions that, when executed by the at least one processor, cause the system to:
      receive, by the first encoder, a stream of content;
      receive notification of an anomalous condition in the content streaming system;
      determine, by the orchestration module and based at least in part on an encoder state evaluation, that the second encoder is available for a handoff of the stream of content;
      generate, by the central version manager and based at least in part on a synchronization of software versions executing on the first encoder and the second encoder, a handoff specification;
      determine a handoff point for the stream of content;
      transfer, based at least in part on the handoff specification and the handoff point, processing of the stream of content.

15. The content streaming system of claim 14, wherein the central version manager stores encoder configuration data and associated software version data, and wherein the handoff specification is generated by the central version manager.

16. The content streaming system of claim 15, wherein the central version manager receives the notification of the anomalous condition.

17. The content streaming system of claim 14, wherein the transfer of the processing of the stream of content is further based at least in part on a cadence of the stream of content.

18. The content streaming system of claim 14, wherein the handoff specification includes provisions for at least one of system resource capture, a software stack configuration, application initiation, or commencement of the receiving and processing of the stream of content.

19. The content streaming system of claim 14, wherein the anomalous condition in the content streaming system is at least one of a security vulnerability or outdated software.

20. The content streaming system of claim 14, wherein the stream of content is a live media stream including video data and audio data.

* * * * *